US010412951B2

(12) United States Patent
Robinson

(10) Patent No.: US 10,412,951 B2
(45) Date of Patent: Sep. 17, 2019

(54) FISHING ACCESSORY WITH CAMERA MOUNT

(71) Applicant: Beau Robinson, Fairmont, WV (US)

(72) Inventor: Beau Robinson, Fairmont, WV (US)

(*) Notice: Subject to any disclaimer, the term of this patent is extended or adjusted under 35 U.S.C. 154(b) by 249 days.

(21) Appl. No.: 15/648,557

(22) Filed: Jul. 13, 2017

(65) Prior Publication Data

US 2018/0014523 A1    Jan. 18, 2018

Related U.S. Application Data

(60) Provisional application No. 62/361,569, filed on Jul. 13, 2016.

(51) Int. Cl.
| | | |
|---|---|---|
| *A01K 97/14* | (2006.01) | |
| *A01K 77/00* | (2006.01) | |
| *A01K 75/00* | (2006.01) | |
| *G03B 17/56* | (2006.01) | |
| *G03B 29/00* | (2006.01) | |

(52) U.S. Cl.
CPC .............. *A01K 97/14* (2013.01); *A01K 75/00* (2013.01); *A01K 77/00* (2013.01); *G03B 17/561* (2013.01); *G03B 29/00* (2013.01)

(58) Field of Classification Search
CPC ......... A01K 97/14; A01K 75/00; A01K 77/00
USPC .............................................................. 43/5
See application file for complete search history.

(56) References Cited

U.S. PATENT DOCUMENTS

| | | | | |
|---|---|---|---|---|
| 3,095,825 | A * | 7/1963 | Sandberg | ................. F16B 7/10 |
| | | | | 277/434 |
| 5,414,951 | A * | 5/1995 | Martin | .................... A01K 85/01 |
| | | | | 43/17.5 |
| 7,173,197 | B1 | 2/2007 | Kasperek | |
| 8,120,650 | B2 | 2/2012 | Laser | |
| 8,616,789 | B1 * | 12/2013 | Hutchison | ............ F16M 11/048 |
| | | | | 396/428 |
| 9,507,243 | B2 * | 11/2016 | Bianciardi | ............. A01K 91/06 |
| 9,521,373 | B2 * | 12/2016 | Lynch | ...................... H04N 7/18 |
| 2005/0102883 | A1 | 5/2005 | Temes | |
| 2011/0239376 | A1 * | 10/2011 | Schmidt | .................. A45B 3/00 |
| | | | | 7/167 |
| 2012/0167437 | A1 * | 7/2012 | Holmberg | ........... A01M 31/002 |
| | | | | 42/90 |
| 2013/0055600 | A1 | 3/2013 | Burt et al. | |
| 2013/0167428 | A1 | 7/2013 | Alhuwaishel | |
| 2015/0230811 | A1 * | 8/2015 | Kovarik | ........... A61B 17/22031 |
| | | | | 433/29 |
| 2015/0342169 | A1 * | 12/2015 | Zeevi | ..................... A01K 63/04 |
| | | | | 43/4.5 |

(Continued)

*Primary Examiner* — Christopher P Ellis
(74) *Attorney, Agent, or Firm* — Global Intellectual Property Agency, LLC; Daniel Boudwin

(57) ABSTRACT

A fishing accessory with camera mount. The fishing accessory includes a body having a first end and a second end. An elongated handle is configured to be removably securable to the first end of the body. A fishing tool is affixed to the second end of the body. The fishing tool can be a net, a gaff hook, or other tool used for catching and retrieving fish. A camera mount is disposed on an upper side of the body, wherein the camera mount is configured to receive a camera and removably secure the camera to the body. The fishing accessory with camera mount allows users to easily record themselves catching, landing, and displaying a fish.

11 Claims, 3 Drawing Sheets

(56) References Cited

U.S. PATENT DOCUMENTS

| | | | |
|---|---|---|---|
| 2015/0366574 A1* | 12/2015 | Kovarik | A61B 17/22031 |
| | | | 600/104 |
| 2016/0025264 A1* | 1/2016 | Casagrande | F16M 11/14 |
| | | | 248/205.9 |
| 2017/0245483 A1* | 8/2017 | Castaneda | A01K 85/01 |
| 2018/0356278 A1* | 12/2018 | Lebedev | G01G 19/00 |
| 2019/0031302 A1* | 1/2019 | Nutz | B63B 35/71 |

\* cited by examiner

FISHING ACCESSORY WITH CAMERA MOUNT

CROSS REFERENCE TO RELATED APPLICATIONS

This application claims the benefit of U.S. Provisional Application No. 62/361,569 filed on Jul. 13, 2016. The above identified patent application is herein incorporated by reference in its entirety to provide continuity of disclosure.

FIELD OF THE INVENTION

The present invention relates to fishing accessories. More specifically, the present invention provides a fishing accessory having a camera mount for removably securing a camera thereto.

BACKGROUND OF THE INVENTION

Many individuals enjoy fishing for recreational purposes. It can be enjoyable to use a camera to capture images while fishing. Often, one individual will hold the camera and capture images of another individual in the act of fishing. However, if an individual is fishing alone, it can be extremely difficult to utilize a camera and simultaneously perform actions related to fishing. Attempting to hold a rod, net, and a camera can be cumbersome. Further, images captured in this manner tend to be blurry, crooked, or otherwise imperfect due to the inevitable jostling of the camera when being held along with multiple other items.

Even if the individual sets the camera on a stand to automatically take a picture after landing the catch, several problems arise. In catch and release situations, the fish may be greatly harmed if it is kept out of the water for too long while the individual searches for and sets up their camera equipment. Further, setting up the camera after the catch does not allow the individual to obtain an image of themselves actually catching and landing the fish. In light of the above concerns, it is desirable to provide a fishing accessory with a camera mount for removably securing a camera thereto, so that users may easily capture images of themselves fishing.

Devices have been disclosed in the known art that relate to image capturing fishing accessories. These include devices that have been patented and published in patent application publications. These devices generally relate to fishing lures having integrated cameras. However, the devices in the known art have several drawbacks. The devices in the known art are limited to single fishing accessories or tools and do not provide interchangeable fishing tools for different situations. Further, the devices in the known art typically include a camera that is underwater when the fish is caught, and the camera cannot be easily reoriented so that the individual make take a picture of themselves with their catch.

In light of the devices disclosed in the known art, it is submitted that the present invention substantially diverges in design elements from the known art and consequently it is clear that there is a need in the art for an improvement to existing image capturing fishing accessories. In this regard the present invention substantially fulfills these needs.

SUMMARY OF THE INVENTION

In view of the foregoing disadvantages inherent in the known types of image capturing fishing accessories now present in the prior art, the present invention provides a fishing accessory with a camera mount wherein the same can be utilized for providing convenience for the user when capturing images while catching, landing, and displaying a fish. The fishing accessory with camera mount includes a body having a first end and a second end. An elongated handle is configured to be removably securable to the first end of the body. A fishing tool affixed to the second end of the body. The fishing tool can be a net, a gaff hook, or other tool used for catching and retrieving fish. A camera mount is disposed on an upper side of the body, wherein the camera mount is configured to receive a camera and removably secure the camera to the body. The fishing accessory with camera mount allows users to easily record themselves catching, landing, and displaying a fish.

Other objects, features, and advantages of the present invention will become apparent from the following detailed description taken in conjunction with the accompanying drawings.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
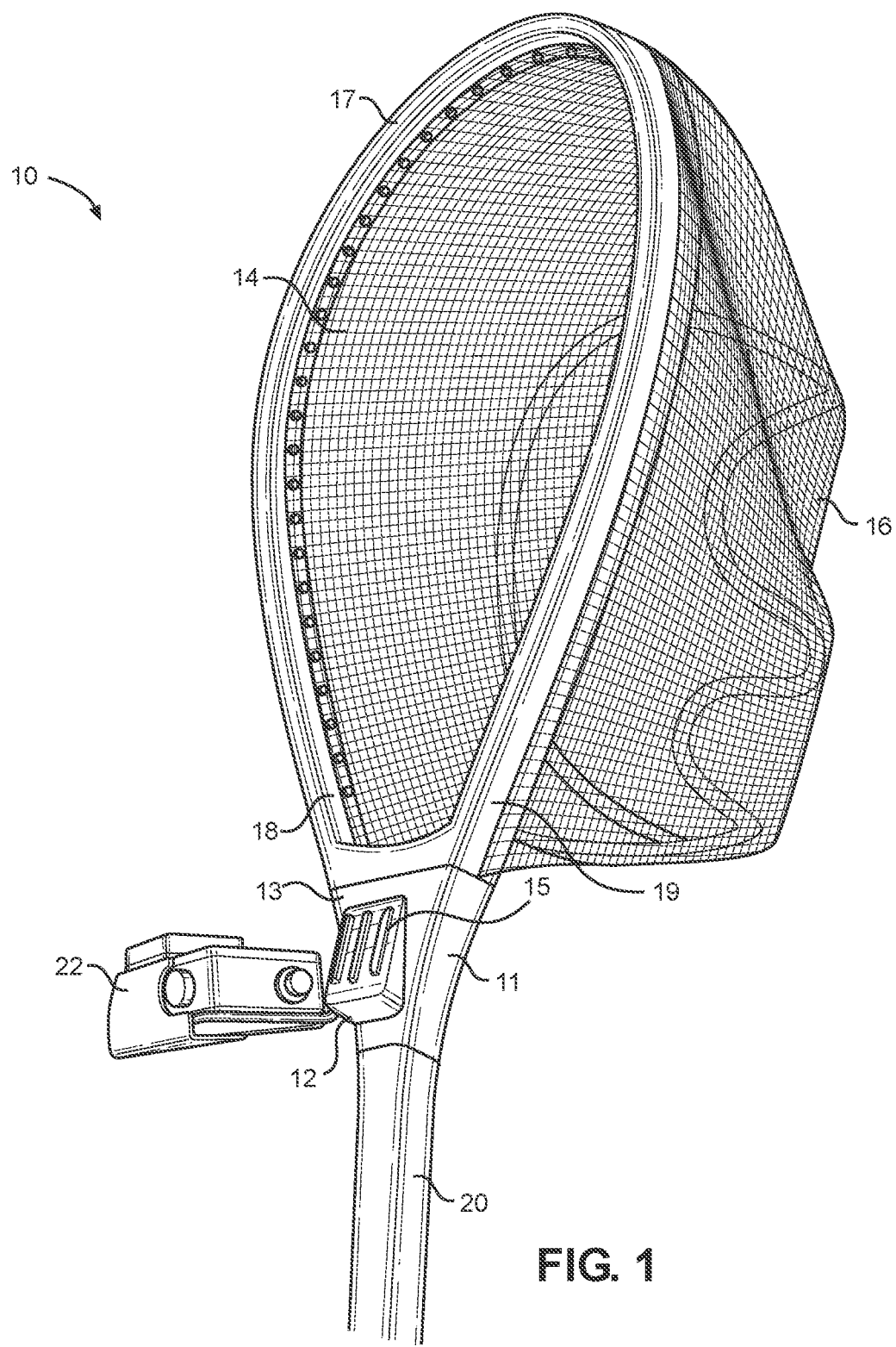
FIG. 1 shows a perspective view of one embodiment of the fishing accessory with camera mount.

Reference is made herein to the attached drawings. Like reference numerals are used throughout the drawings to depict like or similar elements of the fishing accessory with camera mount. For the purposes of presenting a brief and clear description of the present invention, the preferred embodiment will be discussed as used for capturing images while fishing, particularly when catching, landing, and displaying a fish. The figures are intended for representative purposes only and should not be considered to be limiting in any respect.

Referring now to FIG. 1, there is shown a perspective view of one embodiment of the fishing accessory with camera mount. The fishing accessory 10 generally comprises a body 11 having a first end 12 and a second end 13. An elongated handle 20 is removably secured to the first end 12 of the body 11. The body 11 and the elongated handle 20 may be composed of aluminum or a similarly durable material. A fishing tool 14 is affixed to the second end 13 of the body 11.

In the illustrated embodiment, the fishing tool 14 is a net comprising a rounded frame 17 having netting 16 secured thereto. The frame 17 may be made from aluminum or a similarly durable material, and the netting 16 may be composed from rubber or a similarly resilient material. A first end and second end 18, 19 of the frame 17 are each affixed to the second end 13 of the body 11. While a net is shown in FIG. 1, any fishing tool 14 may be affixed to the body 11. A camera mount 15 is disposed on an upper side of the body 11, wherein the camera mount 15 is configured to receive a camera 22 and removably secure the camera 22 to the body 11. The camera 22 is oriented toward the netting 16 so that it can be utilized to capture images while simultaneously using the fishing tool 14 for its intended purpose. Images can be captured, for example, when a fish is landed, when it is retrieved from the netting 16, and when the user is holding the fish after retrieval.

Figure 2:
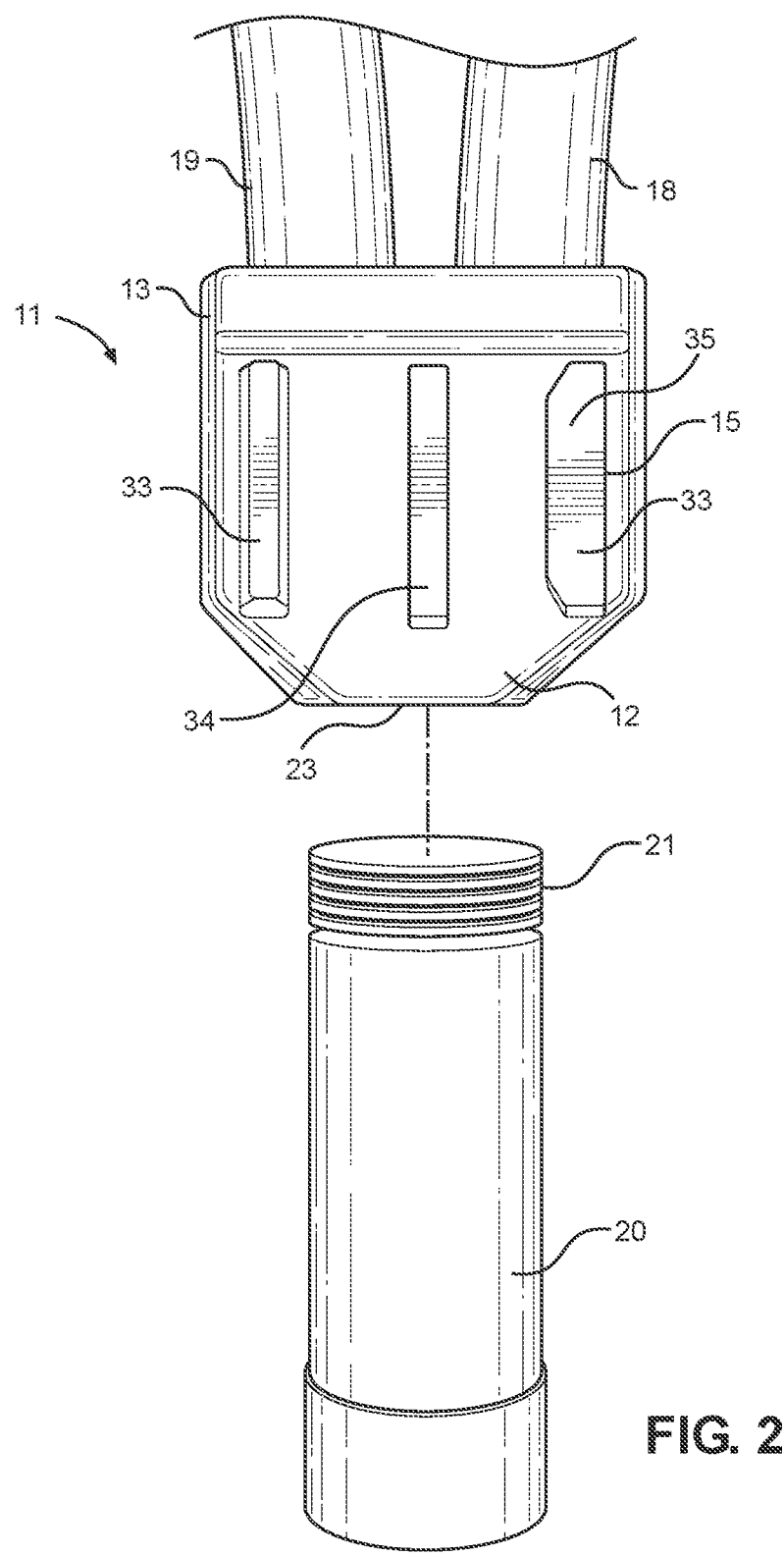
FIG. 2 shows a perspective view of the camera mount component of the fishing accessory with camera mount.

Referring now to FIG. 2, there is shown a perspective view of the camera mount component of the fishing accessory with camera mount. The body 11 tapers inwardly from the second end 13 toward the first end 12. In the shown embodiment, the camera mount comprises a pair of tabs 33 disposed on opposing sides of a central ridge 34. The tabs and ridge 33, 34 are arranged in a parallel configuration. The height of the tabs 33 is greater than the height of the central ridge 34, so that a camera may be easily mounted thereto. In some embodiments, the tabs 33 each include an overhanging lip 35 that extends towards the central ridge 34. The camera mount 15 disposed on the body 11 in the illustrated embodiment has a particular structure, however other camera mounting structures may be utilized in order to attach different types of camera to the camera mount 15.

The handle 20 is removably secured to the body 11 by inserting the handle 20 into an aperture 23 disposed on the first end 12 of the body 11. In the shown embodiment, the handle 20 is removably secured to the body 11 via a threaded connection therewith, with threading 21 disposed on the handle 20 and corresponding threading disposed within the aperture 23. In alternate embodiments, the handle 20 can be removably secured to the body 11 using a friction fit, a ball detent locking mechanism, or any other suitable securement mechanism.

Figure 3:
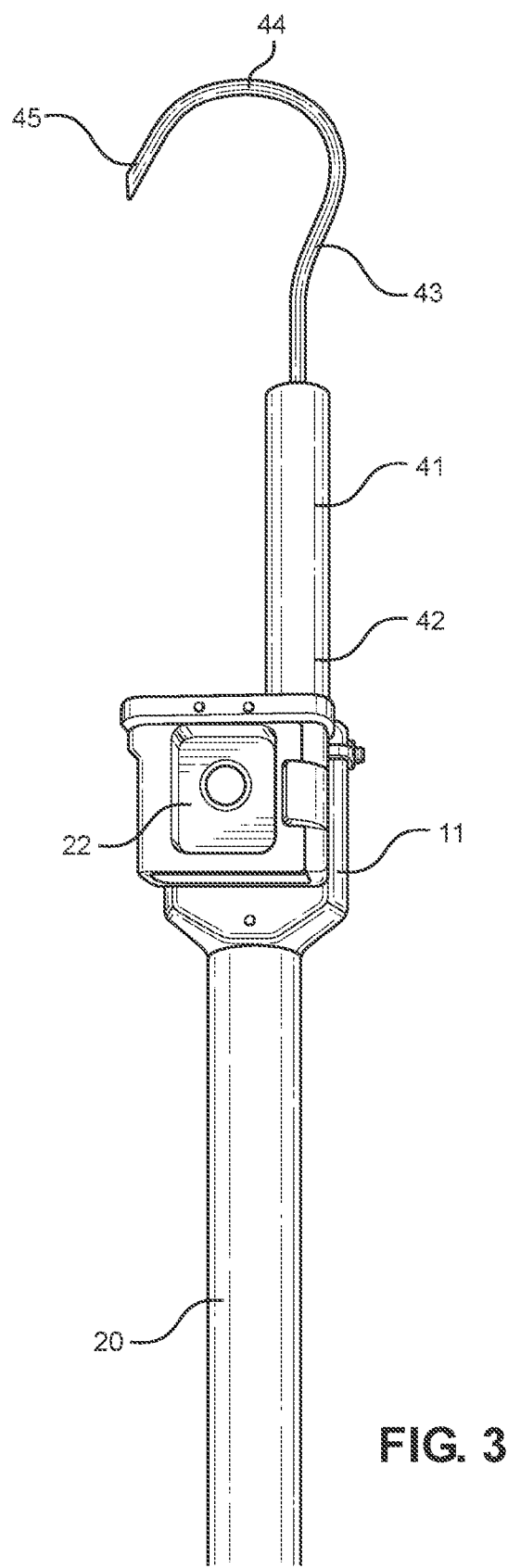
FIG. 3 shows a perspective view of an alternate embodiment of the fishing accessory with camera mount.

Referring now to FIG. 3, there is shown a perspective view of an alternate embodiment of the fishing accessory with camera mount. In an alternate embodiment, the fishing tool comprises a gaff hook 41 affixed to the body 11 at a first side 42 thereof. A second side 43 of the gaff hook includes a curved portion 44 that terminates in a pointed end 45, which may or may not have a barb thereon. The camera 22 secured to the body 11 is oriented to face the gaff hook 41. In this way, the camera 22 can capture images of a fish when hooked by the user.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A fishing accessory, comprising:
a body having a first end and a second end;
an elongated handle configured to be removably securable to the first end of the body;
a fishing tool affixed to the second end of the body;
a camera mount disposed on an upper side of the body, wherein the camera mount is configured to receive a camera and removably secure the camera to the body.

2. The fishing accessory of claim 1, wherein the fishing tool comprises a gaff hook comprising a first side and a second side, wherein the first side of the gaff hook is affixed to the body, and wherein the second side of the gaff hook is curved and terminates in a pointed end.

3. The fishing accessory of claim 1, wherein the fishing tool comprises a net comprising a rounded frame having a first end and a second end, wherein the first end and the second end of the round frame are each affixed to second end of the body.

4. The fishing accessory of claim 3, wherein the net comprises a rubber netting material affixed to a perimeter of the frame.

5. The fishing accessory of claim 3, wherein the frame is composed of aluminum.

6. The fishing accessory of claim 1, wherein a sidewall of the camera mount tapers inwardly from the second end toward the first end thereof.

7. The fishing accessory of claim 1, wherein the camera mount comprises a pair of tabs disposed on opposing sides of a central ridge, wherein the pair of tabs and the central ridge are arranged in a parallel configuration.

8. The fishing accessory of claim 7, wherein each tab of the pair of tabs comprises an overhanging lip that extends inwardly toward the central ridge.

9. The fishing accessory of claim 7, wherein the central ridge comprises a first height and the pair of tabs each comprise a second height, wherein the second height is greater than the first height.

10. The fishing accessory of claim 1, wherein the body and the elongated handle are composed of aluminum.

11. The fishing accessory of claim 1, wherein the elongated handle is removably secured to the first end of body via a threaded connection therewith.

* * * * *